United States Patent
Jalbout et al.

(10) Patent No.: US 11,390,933 B2
(45) Date of Patent: *Jul. 19, 2022

(54) SYSTEM, APPARATUS, AND PROCESS FOR LEACHING METAL AND STORING THERMAL ENERGY DURING METAL EXTRACTION

(71) Applicants: CLEAN RESOURCES PTE. LTD, Singapore (SG); The Arizona Board of Regents on Behalf of the University of Arizona, Tucson, AZ (US)

(72) Inventors: Abraham Fouad Jalbout, Tucson, AZ (US); Andres Godinez, Hermosillo (MX); Dominic Francis Gervasio, Tucson, AZ (US); Hassan H. Elsentriecy, Tucson, AZ (US)

(73) Assignees: CLEAN RESOURCES PTE. LTD, Singapore (SG); The Arizona Board of Regent on Behalf of The University of Arizona, Tucson, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/023,111

(22) Filed: Sep. 16, 2020

(65) Prior Publication Data

US 2021/0002742 A1 Jan. 7, 2021

Related U.S. Application Data

(63) Continuation of application No. 14/847,068, filed on Sep. 8, 2015, now Pat. No. 10,907,238.
(Continued)

(51) Int. Cl.
*C25C 7/00* (2006.01)
*C22B 11/00* (2006.01)
(Continued)

(52) U.S. Cl.
CPC .............. *C22B 11/044* (2013.01); *C22B 3/00* (2013.01); *C22B 3/02* (2013.01); *C22B 4/00* (2013.01);
(Continued)

(58) Field of Classification Search
CPC .. C25C 3/00; C25C 7/005; C25C 3/34; C25C 7/025; C25C 3/02; C25C 7/06; C25C 3/08; C25C 1/00
See application file for complete search history.

(56) References Cited

U.S. PATENT DOCUMENTS

| 2,862,863 A | 12/1958 | Grififth |
| 3,777,011 A | 12/1973 | Veloso |

(Continued)

FOREIGN PATENT DOCUMENTS

| WO | WO-1987002074 | 4/1987 |
| WO | WO2013/022552 A2 | 2/2013 |
| WO | WO-2014153570 A9 | 9/2014 |

OTHER PUBLICATIONS

Mark E. Schlesinger, Matthew J. King, Kathryn C. Sole, William G. Davenport, Extractive Metallurgy of Copper, Fifth Edition (2011), Elsevier, printed and bound in Great Britain, ISBN: 978-0-08-096789-9.
(Continued)

*Primary Examiner* — Zulmariam Mendez
(74) *Attorney, Agent, or Firm* — Blank Rome LLP

(57) ABSTRACT

An environmentally friendly (e.g. no acid, base, or cyanide) system and process for large scale extraction of metal ion into aerobic molten salt (or ionic liquid) and the electrodeposition of metal (e.g. copper, gold, silver, etc.) from the metal ion dissolved in the molten salt. The non-volatile low vapor pressure liquid salt is reusable, and heat from the molten slag can heat the molten salts or ionic liquids.
(Continued)

Another embodiment comprises a one-pot apparatus for the extraction of metal (e.g. copper) from metal earths and electrodepositing the metal using a low melting (209° C.) aerated Na—K—Zn chloride salt in which copper metal oxidizes and is converted to soluble copper chloride. When an electrical power supply is connected to the graphite vessel (cathode) and to copper rods in the melt (anodes), then the copper chloride is deposited as copper metal by electroreduction on the bottom of the graphite reaction vessel.

20 Claims, 7 Drawing Sheets

Related U.S. Application Data

(60) Provisional application No. 62/047,731, filed on Sep. 9, 2014.

(51) Int. Cl.

| | | |
|---|---|---|
| *C22B 4/08* | (2006.01) | |
| *C22B 4/00* | (2006.01) | |
| *C22B 15/00* | (2006.01) | |
| *C25C 3/34* | (2006.01) | |
| *C25C 7/02* | (2006.01) | |
| *C22B 3/02* | (2006.01) | |
| *C22B 7/04* | (2006.01) | |
| *C22B 3/00* | (2006.01) | |
| *C25C 3/00* | (2006.01) | |

(52) U.S. Cl.
CPC .............. *C22B 4/08* (2013.01); *C22B 7/04* (2013.01); *C22B 11/04* (2013.01); *C22B 15/0065* (2013.01); *C25C 3/00* (2013.01); *C25C 3/34* (2013.01); *C25C 7/025* (2013.01); *Y02P 10/20* (2015.11)

(56) References Cited

U.S. PATENT DOCUMENTS

| | | |
|---|---|---|
| 4,475,993 A | 10/1984 | Blander et al. |
| 4,637,865 A | 1/1987 | Sergent |
| 4,740,279 A | 4/1988 | Muller et al. |
| 4,888,102 A | 12/1989 | Kessie |
| 5,118,396 A | 6/1992 | Claus et al. |
| 5,516,353 A | 2/1996 | Sahai |
| 7,422,621 B2 | 9/2008 | Ando |
| 8,398,740 B2 | 3/2013 | Heimala et al. |
| 2003/0183514 A1 | 10/2003 | Aune |
| 2004/0168909 A1* | 9/2004 | Larson .............. C25C 7/02 |
| | | 204/233 |
| 2008/0093222 A1 | 4/2008 | Inazawa |
| 2008/0105553 A1 | 5/2008 | Nitta |
| 2011/0058997 A1 | 3/2011 | Seetharaman et al. |
| 2012/0193224 A1 | 8/2012 | Suk |
| 2014/0166502 A1 | 6/2014 | Teng et al. |
| 2015/0010875 A1 | 1/2015 | Raade et al. |

OTHER PUBLICATIONS

Jianming Lu and David Dreisinger, "Solvent extraction of copper from chloride solution I: Extraction isotherms", Hydrometallurgy 137 (2013) 13-17.
S. Ayata and H. Yildiran, "Copper extraction from gold bearing copper (II) sulphide without thermal process to obtain gold concentrate", Minerals Engineering 18 (2005) 901-904.
Ionela Birloaga, Ida De Michelis, Francesco Perella, Mihai Buzatu and Francesco Veglio, "Study on the influence of various factors in the hydrometallurgical processing of waste printed circuit boards for copper and gold recovery", Waste Management 33 (2013) 935-941.
Dominic Gervasio, Hassan H. Elsentriecy, Luis Phillipi da Silva , A.M. Kannan, Xinhai Xu,, "Materials Challenges for Concentrating Solar Power", Chapter 4, in Nanoscale Materials and Devices for Electronics, Photonics and Solar Energy, ISBN 9783319186320, Stephen Goodnick, Anatoli Korkin, and Robert Nemanich, Editors, in the "Nanostructure Science and Technology" series, editor: David Lockwood Springer editor: David Packer, Springer, NY, NY (2015).
K. Vignarooban, P. Pugazhendhi, C. Tucker, D. Gervasio and A.M. Kannan, "Corrosion resistance of Hastelloys in molten metal-chloride heat-transfer fluids for concentrating solar power applications", Solar Energy, 103, pp. 62-69 (2014).
H.H. Elsentriecy et al., "Clean and Efficient Extraction of Copper Ions and Deposition as Metal", ScienceDirect; www.sciencedirect. com; 2015; pp. 28-33.
European Search Report of European Application No. 16 84 4835.

\* cited by examiner

```
┌─────────────────────────────────────────────────────────────┐
│ A metal ore or slag is mixed with low vapor pressure liquid │
│ (e.g. molten salts or ionic liquid), at high temperature    │
│ and until the metals are dissolved in the liquid solution.  │
│                          210                                │
└─────────────────────────────────────────────────────────────┘
                              │
                              ▼
┌─────────────────────────────────────────────────────────────┐
│  The liquid solution is separated from the ore or slag by   │
│                         filtration.                         │
│                           220                               │
└─────────────────────────────────────────────────────────────┘
                              │
                              ▼
┌─────────────────────────────────────────────────────────────┐
│    The liquid solution is put into an electrochemical       │
│               reactor for electrodeposition.                │
│                           230                               │
└─────────────────────────────────────────────────────────────┘
                              │
                              ▼
┌─────────────────────────────────────────────────────────────┐
│  Metal ions from the liquid solution are electrodeposited   │
│              on electrodes by applying a current.           │
│                           240                               │
└─────────────────────────────────────────────────────────────┘
```

FIG. 2

SYSTEM, APPARATUS, AND PROCESS FOR LEACHING METAL AND STORING THERMAL ENERGY DURING METAL EXTRACTION

CROSS-REFERENCE TO RELATED APPLICATION

This utility application is a continuation of U.S. patent application Ser. No. 14/847,068, which was filed on Sep. 8, 2015, which claims priority to U.S. Provisional Application No. 62/047,731, which was filed on Sep. 9, 2014. The entire contents of those applications are incorporated herein by reference.

FIELD OF THE DISCLOSURE

The present disclosure is directed to an environmentally friendly leaching process for the extraction of metals from slag and ore, a one pot apparatus to perform the process in, and a system for the large scale production of the leaching process.

BACKGROUND OF THE DISCLOSURE

Conventional metal mining operations, such as for copper, silver, and gold, have the primary purpose of extracting pure metals from ore. To do this, mining operations use a number of different vessels or pots for various mining and extraction steps. For example, in copper mining the copper ore is concentrated by crushing followed by roasting. During the roasting step, the crushed copper ore is heated while being exposed to air (e.g. in an open air vessel). The oxygen and water in the air convert copper sulfides to copper oxides, which is schematically shown in the following reaction:

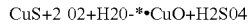

CuS+2 02+H20-*•CuO+H2S04

Next, the copper oxides are smelted by reheating in the presence of a chemical reducing agent, which separates the copper metal from undesirable elements. These undesirable elements are given off as noxious gases, or they float in the smelting vessel as a material called slag, while the desired copper metal base sinks in the smelting vessel and is called matte. The matte is then collected and dissolved in a strong acid, such as aqueous sulfuric acid. Applying electrical power to cathodes in this acidic copper solution yields pure copper. And yet, there are still residual amounts of copper that can be recovered from the slag. The process of slag recovery in copper mining has been an issue of attention for ecological, economical and logistical reasons. Unfortunately there are a number of problems associated with slag.

Slag is typically dumped or used as road ballast, backfill material, sandblasting agents, cement additives, or material for roofing shingles. However, slag can seep into river water, streams, soil, and surroundings which can be dangerous to the environment because slag contains heavy metal pollutants. Also, slag contains base metals (such as zinc and iron) and some coinage metals (e.g. copper) that are not extracted and get wasted.

There is no shortage of slag generated by mining. For example, for every ton of copper produced, roughly 2.2 tons of slag is generated. And each year roughly 25 million tons of copper slag is generated worldwide as a result of copper mining and refining. Most of this slag has low solubility in water; therefore it is a chemically inert substance, which makes it difficult to process.

The slag is also extremely hot (e.g. up to about 1650 degrees Celsius). Slag is normally poured into slag pits and allowed to cool. It would be extremely beneficial if the thermal energy from the cooling slag could be used in the leaching process (e.g. via heat transfer) in order to minimize the costs and equipment required to heat the metal extraction process.

There has been increasing attention paid to hydrometallurgical processes to recover the high value metals from the slag that forms during copper smelting. Research has focused on leaching processes at atmospheric pressure, using lixiviants such as acids, bases, and salts, and also on high pressure oxidative acid leaching. Metals such as copper, silver and gold in the slag may be recovered using these leaching processes, but these acids and bases are extremely harmful to the environment.

The cyanide method is also used for extracting metals from ore and slag, such as gold, copper, silver and gold. Unfortunately, the cyanide method of metal extraction is undesirable due to the highly poisonous nature of cyanide. As a result, the cyanide method is banned in a number of countries and territories.

Therefore, there is a need within the mining industry for an economical, efficient, and environmentally friendly process and system to extract metals from slag (e.g. copper, silver, gold, etc.) when the slag is produced by conventional leaching methods. It would also be beneficial if the same environmentally benign process could extract metal from both the ore and the slag produced by the ore, either concurrently, or sequentially. It would also be beneficial if the thermal energy needed to heat the reagents (e.g. molten salts and/or ionic liquids) during the leaching process came from pre-heated slag, versus the use of conventional heating equipment—ovens, etc. And it would be economically and environmentally beneficial if the reagents in the environmentally friendly leaching process could be re-cycled and used with sequential leaching processes on new ore and/or slag material.

SUMMARY OF THE DISCLOSURE

The various embodiments of the present disclosure comprise a system, apparatus, and process for the extraction of metals from ore and/or slags using low vapour pressure liquids, such as molten salts or ionic liquids. This environmentally friendly leaching process is an alternative to conventional methods of metal extraction that use acids, bases or cyanide. The system and process disclosed herein allow for the extraction of metals from slag and/or ore. In an embodiment, the slag is a by-product resulting from conventional mining extraction processes using leaching methods with acids, bases, etc.

In another embodiment, the system and process disclosed herein may also be used to extract metal from ore and from the slag generated as a by-product of the ore. These extractions from ore and slag may occur concurrently, or sequentially (i.e. ore then slag). Therefore, in an embodiment, the present disclosure of metal extraction from ore and slag can completely replace a mining operation that relies upon toxic leaching processes using acids, bases, cyanide, etc. In an embodiment, the ore and slag are processed concurrently using the environmentally friendly leaching process of low vapour pressure reagents. In another embodiment, the ore and the slag that is derived from the ore are processed sequentially using the low vapour pressure liquids such as molten salts or ionic liquids.

The system and process disclosed herein also allows thermal energy from pre-heated slag to be transferred and utilized or stored instead of being lost. Slag that is produced by conventional leaching processes is pre-heated up to approximately 1650 degrees Celsius. In the present disclosure, the heat from this slag is transferred and used to heat the environmental friendly leaching process disclosed herein that does not use acids, bases, or other toxic reagents.

The environmentally friendly leaching process disclosed herein comprises the use of low vapour pressure liquids, such as molten salts or ionic liquids, for dissolving and extracting metals from the ore and/or slags and recovering them by electrodeposition. In one or more embodiments, such as for small scale operations, the extraction and electrodeposition steps occur sequentially in the same vessel (e.g. crucible, pot, kettle, container, etc.). Additionally, the present disclosure covers large scale mining operations where the metal extraction and electrodeposition are conducted in close proximity to each other, but in separate vessels, or co-located at the same facility.

The molten salts or ionic liquids used in the present disclosure have a very low vapour pressure, such as between about two pounds per square inch gauge (2 psig) at an operating temperature of 500 degrees Celsius to about ½ atmosphere (i.e. 7 psig) or less at 800 degrees Celsius to 1 atmosphere or less at temperatures as high as 1400 degrees Celsius. The salts also have low temperatures of melting (i.e. will transition from a solid to a liquid phase, as low as 200 degrees Celsius and as high as 400 degrees Celsius). The salts are aerated (i.e. exposed to air in an open container) to dissolve the oxygen and water from air into the molten salts or ionic liquid to form a mixture which extracts all metal and metal ions in the ore or slag into the salt as ionic metal chlorides. The metal and metal oxides are unstable and dissolve in the aerated molten halide salt by the process in which metals and metal ions are transformed to metal halides, which in turn can then be electrodeposited on a cathode in the same pot as metals.

The molten salts or ionic liquids used in the present disclosure do not have appreciable vapor pressure so they practically are not able to transition from a liquid phase to a vapor phase until temperatures are considerably higher than 1000 degrees Celsius because formation of salt vapor is inhibited by electrostatic attraction with the bulk salt. Contrarily, conventional leaching processes using aqueous acid and base electrolytes would not be suitable at such high temperatures because water boils at 100 degrees Celsius.

An advantage of the processes and systems disclosed herein is the ability to save energy that is otherwise lost from the slag. The molten salts used to process copper slag as described herein are used at high temperatures (e.g. about 400-500 degrees Celsius, for example in one-pot systems and as high as 1000 degrees Celsius for large scale operations). These processing temperatures are compatible with extracting heat from slag. The high temperatures of slag (up to approximately 1650 degrees Celsius) carry a significant amount of thermal energy. Most of this energy is lost and not recovered when ores are quenched and cooled to produce glassy granules. The energy consumed in high temperature processing of metals is distributed between metal, slag, off-gas, and the natural losses to the atmosphere. The slag thermal energy accounts for about 10-90 percent of the output energy and depends on the slag to metal ratio, as well as discharge temperature. The primary constraint faced in obtaining energy from metallurgical slags is the low thermal conductivity of the slag, which ranges from about 1 to 3 W m'1 K'1 for solid slag, to 0.1-0.3 W m'1 K'1 for molten slag at 1200-1300 degrees Celsius. This extremely high temperature explains why the air cooled slag remains liquid for days [8], Ferrous slags account for 90 percent of the available energy associated with slags, which makes them a huge potential for reservoirs to provide thermal energy that is transferred to heat the molten salts or ionic liquids. Processing the recovery of metal from these slags with the molten salt described herein opens a new way to not just recover metal but also valuable heat energy.

Embodiments of the process disclosed herein include a heat transfer process and system for slag materials. Thus, the process of leaching metal from ore or slag disclosed herein includes the utility of better extraction of metals from ore, or extraction of metal from slag, as well as the utility of capturing and utilizing heat wasted during conventional processing by preserving energy using a heat transfer process in the system.

The process and system disclosed herein can be considered a robust solution to not only extract metal from molten ore, but also to store energy through a unique design of a salt tank system.

Molten salts and ionic liquids can be very useful heat carriers for recovering thermal energy from slags. This last development is due to the fact that at the high temperature (up to 1300 degrees Celsius) these kinds of liquid salts can operate as heat transfer fluids, whereas no other known conventional heat carrier can work at such temperatures, e.g. slag is about 1650 degrees Celsius and thus conventional methods of metal extraction using acids, bases or cyanides on slag do not work, and non-molten salts would not work with slag.

Several processes have been developed to recover the waste energy of the slag, but few have been shown to be viable. However, the leaching process and energy recovery cycle described herein can be combined using the same molten salt and materials for equipment.

Thermoelectric power generation based on the slag waste heat could potentially be coupled to the leaching process described herein. Heat exchange from the molten salt to a water reservoir can also generate steam for powering a turbine generator.

One-Pot Apparatus and Process

One or more embodiments of the present disclosure comprise a container, in a one-pot metal extraction and electrodeposition apparatus. The apparatus, or system, comprises: 1) a high temperature resistant, corrosion resistant outer crucible, wherein the outer crucible comprises non-porous glassy carbon material, or non-porous ceramic-filled graphite or quartz or a non-porous ceramic material; 2) a high temperature resistant, corrosion resistant inner crucible centered within a bottom of the outer crucible, wherein the inner crucible is cathodic (i.e. functions as a cathode in an electric circuit), and the inner crucible comprises porous graphite or non-porous glassy carbon material or a non-porous ceramic-filled graphite; 3) a molten salt within the inner crucible produced by combining a low melting aerated chloride salt and metal ore or slag; 4) an anode rod positioned vertically within the inner crucible; 5) a power supply operatively connected to the inner crucible cathode and the anode rod; and, 6) a means to stir for continuously mixing the molten salt and slag/ore within the inner crucible.

During the method of use of the apparatus, slag and/or ore are inserted into the inner crucible and stirred into molten salt or ionic liquid to form a mixture from which first metal is extracted and second pure metal is electrodeposited. The area within the outer crucible that encases the inner crucible outer wall comprises a material of high temperature that is used to heat the inner crucible (e.g. melted slag, etc.).

In an embodiment, in the one-pot metal extraction and electrodeposition apparatus, the molten salt within the inner crucible is maintained at a viscosity of less than 100 centipoise. Typically this is achieved by maintaining a temperature between about four hundred and five hundred degrees Celsius, or any other temperature bringing about a viscosity of less than 100 centipoise for the mixture. For certain metals or salts, a higher temperature may be necessary to achieve this viscosity.

And, in the one-pot metal extraction and deposition apparatus, the molten salt is a low melting aerated chloride salt composition. In a preferred embodiment, this chloride salt may be composition of sodium chloride, potassium chloride, and zine chloride (i.e. NaCl—KCl—ZnCb) or else another such chloride salt that would typically be known and used by one of ordinary skill in the art.

Also, in one or more embodiments, the metal ore or slag may comprise about twenty to thirty percent metal, such as copper metal that is to be extracted and electrodeposited onto an electrode from which it is subsequently recovered as a "pure metal".

One-Pot Process:

In one or more embodiments, a process for extracting metal from ore or slag comprises a first step of providing a one-pot apparatus comprising: 1) a high temperature resistant, corrosion resistant outer crucible; 2) a high temperature resistant, corrosion resistant inner crucible centered within a bottom of the outer crucible, wherein the inner crucible is a cathode and stores an aerated molten salt that is produced by combining a low melting aerated chloride salt with a metal ore or slag; 3) a heated material within the outer crucible and encircling the inner crucible, and able to maintain the inner crucible at a temperature between about four hundred to five hundred degrees Celsius; and 4) an anode rod positioned vertically within the inner crucible. While a temperature of about four hundred to five hundred degrees Celsius is preferred, the process may include any temperature where viscosity of the molten salt and ore or slag mixture is less than 100 centipoise. In an embodiment, the inner crucible comprises porous graphite, non-porous glassy carbon material or non-porous ceramic filled material and the outer crucible comprises non-porous glassy carbon material or non-porous ceramic-filled graphite or quartz or a non-porous ceramic material.

In a second step, the aerated molten salt is mixed in the inner crucible with slag and/or ore until the metal within the molten salt is extracted via oxidization and exchange of chloride with oxide anion in metal oxide to form metal chloride. In an embodiment, mixing the aerated molten salt occurs for about one hour at a temperature of about four hundred to five hundred degrees Celsius.

In a third step, a power supply is attached to the electrodes and an electrical current is applied between the cathodic inner crucible and the anode rod.

And in a fourth step, conducted via electro-reduction, the dense metal that is derived from the metal chloride sinks and is deposited onto the bottom of the inner crucible cathode. This pure metal is the final product that is drained, scraped, or otherwise removed from the crucible.

In an embodiment of the one-pot process, the aerated molten salt is a composition of about: 13.4% sodium chloride, 33.7% potassium chloride, and 52.9% zinc chloride (2), and the composition has a melting temperature of about two hundred four degrees Celsius.

Multi-Crucible System with Filtration or Decanting

Various embodiments of the present disclosure also comprise environmentally friendly leaching systems and processes for extracting and depositing metals from ore and/or slag, while using a plurality of crucibles, vessels, reactors, containers, etc. The multi-crucible system and process is suitable for full scale manufacturing operations that extract and deposit large quantities of metal from ore and/or slag.

Multi-Crucible System:

The various embodiments of the multi-crucible system comprise the following components: a mixing crucible able to heat and dissolve metal in slag and/or ore that is aerobically mixed with a low vapour-pressure molten salts or ionic liquid; a mechanism to remove the undissolved slag or ore from the mixture (e.g. by filtration or decanting); an electrochemical reactor able to conduct electro-deposition to remove the pure metal from the liquid solution by depositing it on a cathode electrode.

The electro-chemical reactor comprises: a high temperature resistant crucible storing the liquid solution; a cathode electrode and an anode electrode (e.g. graphite) connected to a direct current power supply on an upper end, and immersed in the liquid solution on a bottom end; and, one or more valves to drain the electrified liquid solution from the reactor crucible and into a movable re-cycle tank.

The movable re-cycle tank is able to first receive dense metal (e.g. copper) and then be replaced by an empty tank for receiving the metal-depleted electrified liquid solution comprising molten salts or ionic liquid, which can then be used to transport the electrified liquid salt solution back to the mixing crucible and/or a heat exchanger unit. In an embodiment, the re-cycle tank is heat and liquid sealed to prevent significant loss of heat and the used liquid solution.

The leaching system may further comprise a heat exchanger unit to re-heat the recycled electrified liquid solution (i.e. used molten salts or ionic liquid). The heat exchanger unit comprises the high temperature melted slag from ore smelters that transfers its heat to the electrified liquid solution before it is poured back into the mixing crucible.

Multi-Crucible Process:

In one embodiment, the first process step comprises: heating, mixing and dissolving metal ore or slag into a non-volatile low vapour-pressure liquid in an open air crucible at a temperature between about four and five hundred degrees Celsius to produce a metal rich liquid solution. The non-volatile low vapour-pressure liquid comprises aerobic molten salts or ionic liquid, such as low viscosity NaCl—KCl—ZnCh. Mixing the aerated molten salt causes the extraction of the metals from the ore and/or slag via oxidization and/or exchange of chloride with oxide or sulfide in metal oxide or metal sulphide yielding metal chloride, as disclosed in the following equations.

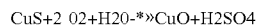

CuS+2 02+H20-*»CuO+H2SO4

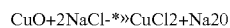

CuO+2NaCl-*»CuCl2+Na20

The second step of the process comprises separating, via filtration or decanting, the liquid solution from the ore or slag that did not dissolve in the mixing crucible. The filtered liquid solution comprises metal ions, and the residual ore/slag is stored or re-cycled to the heat exchanger.

The third step of the process comprises: transferring the liquid solution with the metal ions into an electro-chemical reactor. The reactor comprises: a high temperature resistant housing (e.g. crucible); a cathode electrode and an anode electrode connected to a direct current power supply on an upper end, and immersed in the liquid solution on a bottom end; and, one or more valves to drain the reactor of recyclable molten salt.

The fourth step comprises electro-depositing metal on the cathode electrode from the liquid solution's metal ions when a current is applied between the cathode and anode electrode.

The fifth step comprises first draining the dense metal and second the metal depleted salt to recycle the electrified liquid salt solution by passing the liquid solution through a heat exchanger comprising melted slag from ore smelters that re-heat the liquid solution.

The present disclosure may be used with a variety of types of metal ores and slags, such as copper, gold, and silver, or any combination thereof. Additionally, the molten salt or ionic liquid may comprise: NaCl—KCl—ZnCl2 in several eutectic compositions, 2-aluminium and 3-magnesium chlorides mixed with Na and K chlorides in eutectic compositions, and 4-stable ionic liquids with various cations and chloride anions.

BRIEF DESCRIPTION ON THE DRAWINGS

The drawings and steps are not considered exhaustive but simply illustrative of the processes involved.

FIG. 1 illustrates a schematic diagram of one embodiment of the system and process for extracting metal ion into aerobic molten salt (or ionic liquid) and electrodeposition of metal from the metal ion dissolved in the molten salt. The non-volatile low vapor-pressure liquid salt is reusable and heat can be recovered from molten slags to heat the molten salts or ionic liquids. No acid, base or cyanide is used.

FIG. 2 is a flowchart of the general steps of the process described herein.

Figure 5:
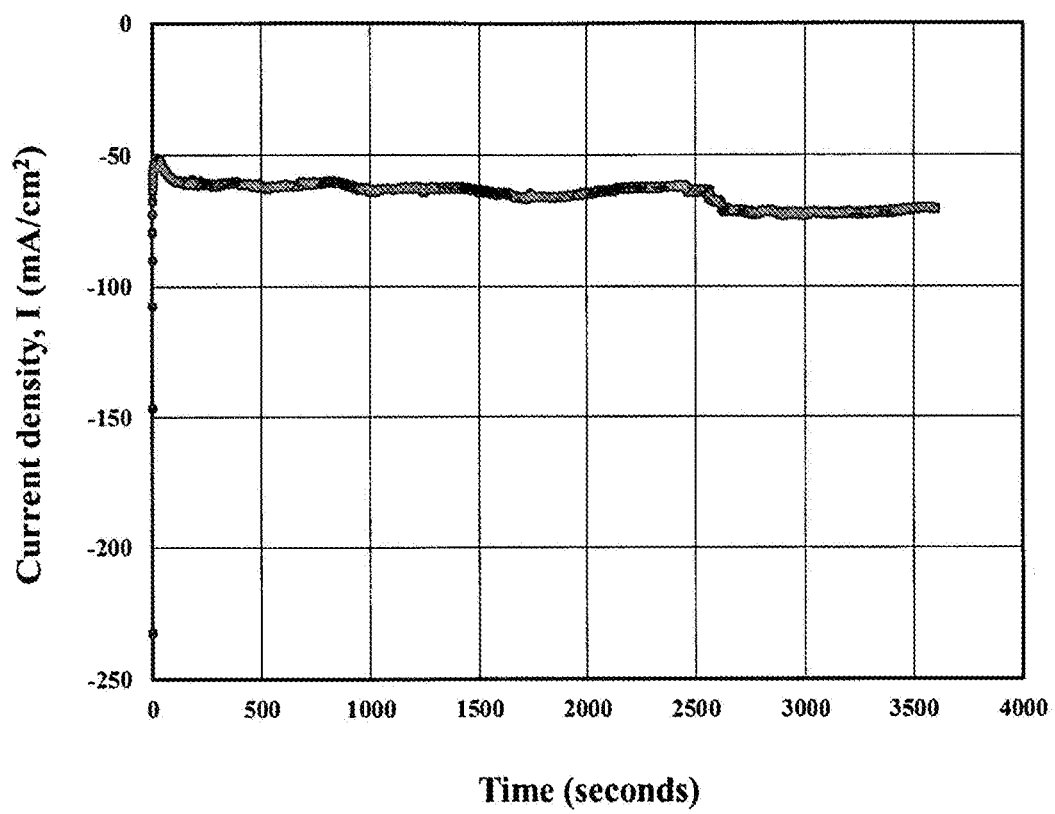

FIG. 5 is a graph showing current density as a function of time as copper metal is electrodeposited from molten NaCl—KCl—ZnCl2 salt containing 3 gm added CUCl2·2H2O at 300° C. WE: graphite. CE: graphite. RE: SSE. Applied potential to WE was −0.5 V vs. Ag/AgCl.

Figure 6:
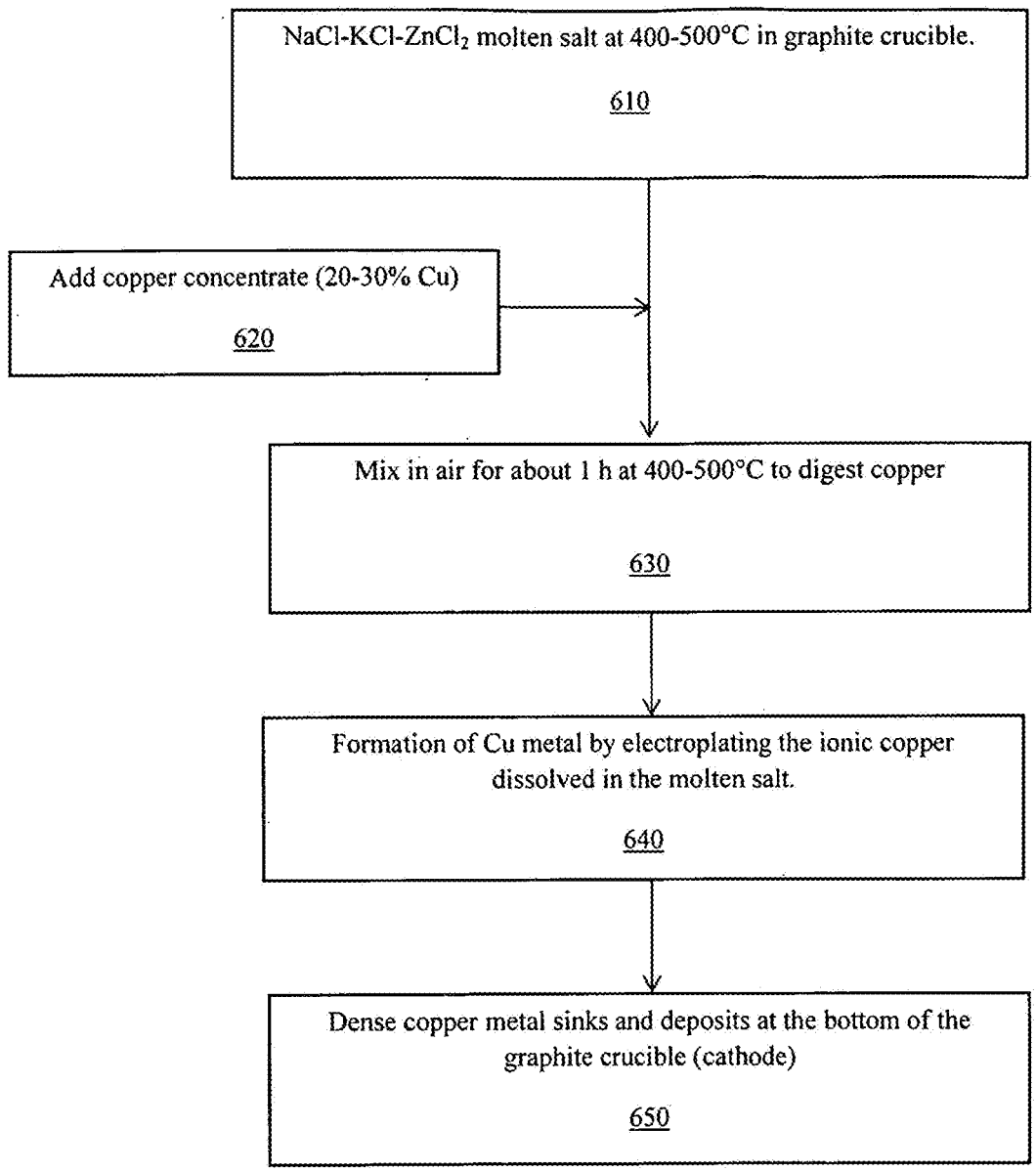

FIG. 6 is a flow chart showing the essential steps to extract and deposit copper in an exemplary embodiment using a one pot process described herein.

Figure 7:
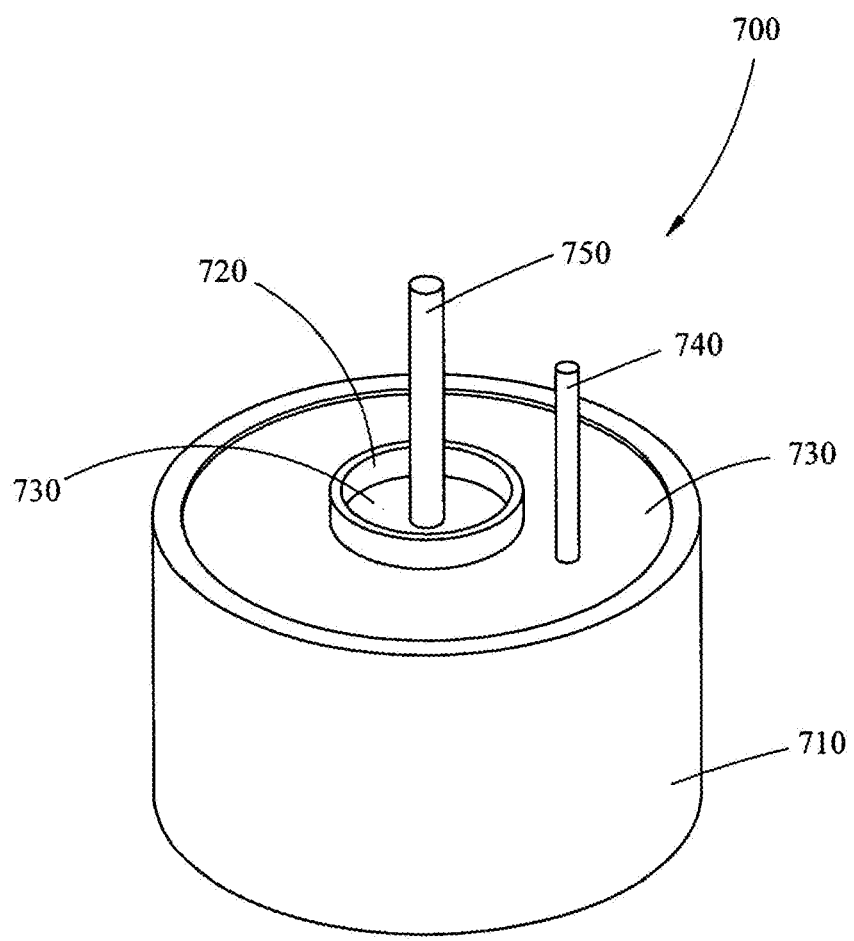

FIG. 7 is an illustration of the one pot apparatus of FIG. 6.

DETAILED DESCRIPTION OF EXEMPLARY EMBODIMENTS

The large scale, manufacturing operation of the various embodiments herein may comprise a variety of embodiments that are by way of non-limiting examples: a multi-crucible system with a filter to remove the slag residues from the liquid solution (e.g. see FIGS. 1, 3, 4); a one-crucible system without filtration and with a cathode and anode electrode rods; and a one-crucible system without filtration wherein the bottom of the crucible functions as a cathode electrode and an anode electrode rod is suspended in the liquid solution (e.g. FIGS. 6 and 7).

Multi-Crucible System and Process with Filtration

Figure 1:
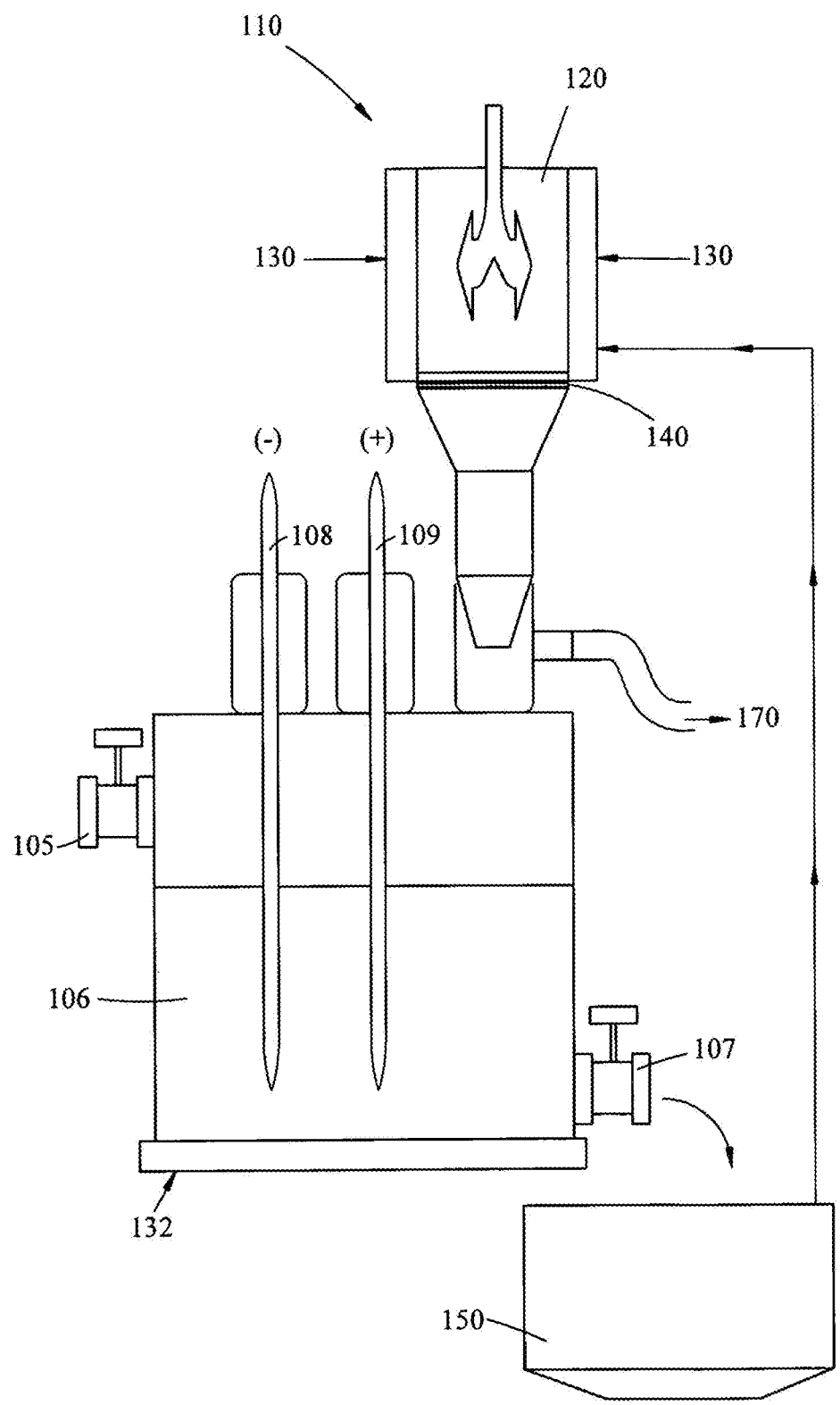

FIG. 1 shows a schematic diagram of one embodiment of the system and process of the present disclosure. Even though this is lab scale dispositive, one of skill in the art could readily convert this disclosure for use as a pilot plant.

Metal ore and/or slag 110 (e.g. comprising copper, gold, silver, or any combinations thereof) is added to and stirred in crucible 120 which contains high temperature, molten salt (MS) or ionic liquid (IF) recycled from tank 150. The crucible 120 is exposed to air, meaning that the top of the crucible remains uncovered, or that air is stirred into the liquid solution. In an embodiment, the molten salt comprises sodium chloride and potassium chloride and zinc chloride eutectic (i.e. NaCL—KCl—ZnCb), in a mixture of a 0.5 to 0.5 to 1 molar ratio, respectively. This NaCl—KCl—ZnCb molten salt melts at about 200° C. and has very low vapour-pressure (7 psig) and is chemically stable to over 1000° C. in air.

The ore or slag is added to crucible 120 via standard machinery known in the art, such as via a crane or conveyer belt. The re-used molten salts or ionic liquids may be pumped or poured into the crucible 120 from the re-cycle tank 150.

Heat is applied to the crucible 120 while the metal from ore or slag is dissolved into the molten salt or into the ionic liquid, and the mixture is stirred to digest the metal ore or slag. This will produce a liquid solution containing a metal chloride (e.g. CuCfr). The appropriate temperature range for the applied heat is about five hundred to eleven hundred degrees Celsius, although other temperatures are envisioned within the scope of the present disclosure and are a function of the type of molten salt or ionic liquid used and the metal being extracted. The source of the heat 130 may be melted slag from ore smelters (e.g. up to 1650 degrees Celsius) and/or standard heat generating electro-mechanical devices known by one of skill in the art.

In one embodiment (as shown in FIG. 1), the liquid solution is passed through a filter 140 by gravity or a vacuum pump 170. Excess slag residue is discarded by inverting the crucible by using, e.g., a crane or other mechanical method. The remaining solution enters a crucible 106 which is subjected to heat via source 132. Crucible 106 comprises a pair of electrodes 108 (anode) and 109 (cathode). Crucible 106 further comprises a pressure release mechanism 105 as a safety mechanism for when the pressure becomes too high within the crucible. Crucible 106 further comprises a valve 107 to first drain the molten metal into a recycling tank 150 and then to drain the used metal depleted molten salt or ionic liquid into the tank 150. The used, heated molten salt in the recycling tank is then transported back to and added into the stirring crucible 120, via for example the use of a crane. One of skill in the art would readily know of mechanisms to transfer used molten salt or ionic liquid from tank 150 to crucible 120 (e.g. automated rail movement, vehicle operated by driver, etc.). Thus the hot molten salt is re-cycled to reduce operating cost for materials and for heating.

During the metal plating step a variety of types of electrodes 108, 109 can be used, (e.g. graphite, glassy carbon, or any stable refractory metal). Metal forms on graphite cathode 109. As metal forms on the cathode 109, the graphite anode 108 will oxidize to carbon dioxide due to the presence of trace water in the molten salt in contact with air. The water ultimately comes from air:

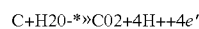

$$C + H_2O \rightarrow CO_2 + 4H^+ + 4e^-$$

In another embodiment of the system of FIG. 1, the crucible 130 may be omitted. The aerated low viscosity molten salt or ionic liquid is poured or pumped directly to the crucible 106 and the slag and/or ore is added via a crane. Mixing is carried out manually or automatedly, and crucible 106 is heated via mechanical means at 132 until the metal in the ore and/or slag is dissolved and converted to a metal salt (e.g. metal chloride such as CuCl2).

A power supply is then connected to the electrodes 108 and 109 and a current is applied between them to convert the metal salt (metal chloride) to metal. The residual ore-slag (undissolved) and the salt float while the isolated metal (Cu) sinks to the bottom of the crucible 106 where it is drained out at valve 107 into tank 150 to form a copper billet (e.g. 30 feet long, about 8 inches in diameter).

The anode (−) electrode 108 is then lifted (mechanically or manually) and residual liquid salt that is depleted of the metal is poured via valve 105 into a container to become recycled molten salt or ionic liquid.

The anode (−) electrode 108 and cathode (+) electrode 109 are lifted and the crucible 106 is inverted to dump the residual slag using a crane. The crucible 106 is then turned back upright and refilled; and the anode (−) electrode 108 and cathode (+) electrode 109 are dropped back into place.

Then the process of heating and mixing and applying an electrical current to extract the metal from the ore or slag is repeated, and where the extracted metal sinks and is drained out of the crucible.

Flowchart of Multi-Crucible Process with Filtration or Decanting

Figure 3:
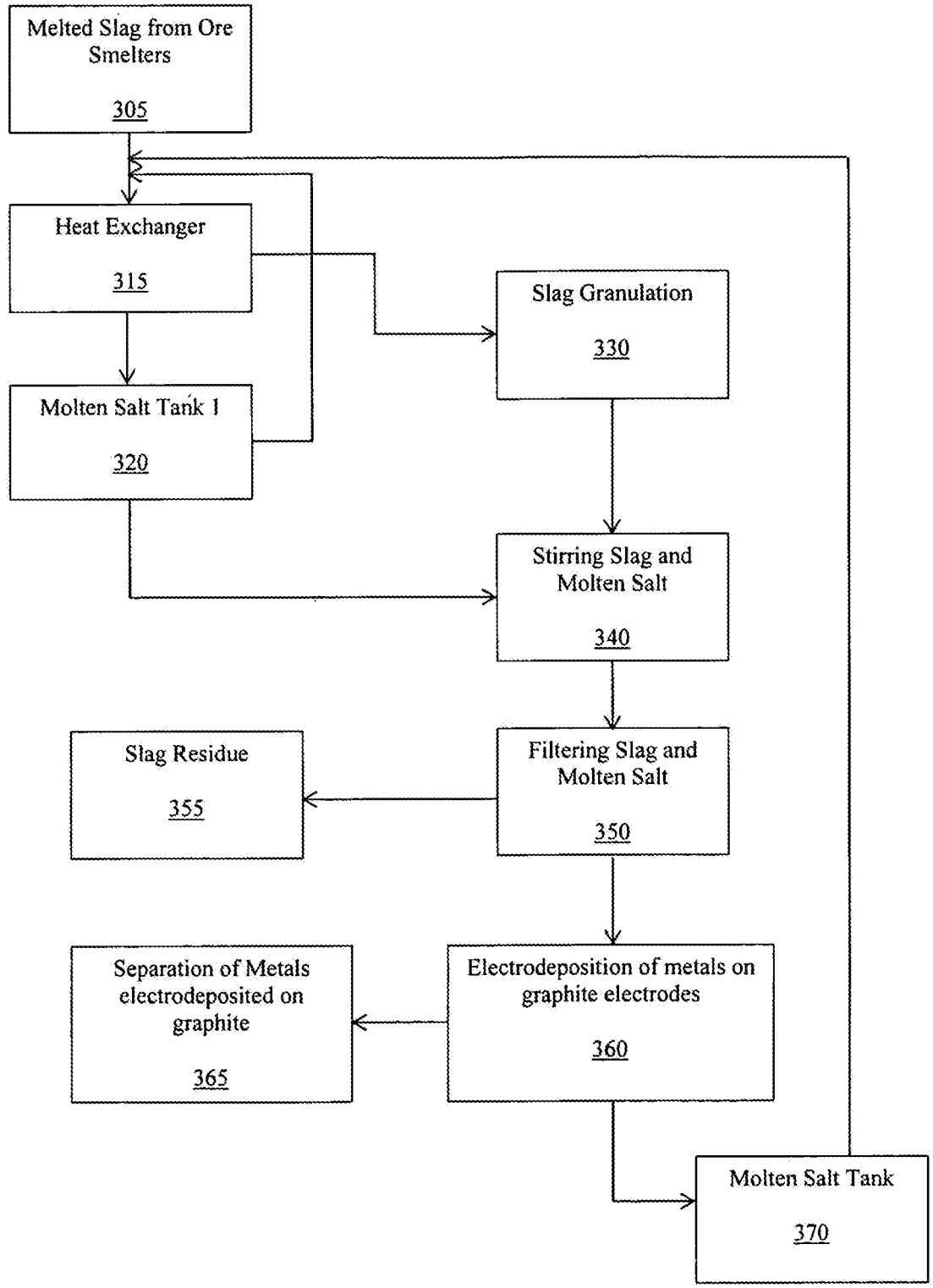
FIG. 3 illustrates a schematic of the process described herein using molten salts as the low vapor pressure liquid, and using a heat exchanger to store and provide thermal heat.

FIG. 2 shows a summary of the general steps of the metal leaching process using low vapor pressure, aerated molten salts or ionic liquids of the various embodiments disclosed herein, and FIG. 3 is one exemplary embodiment of FIG. 2.

In step 210, the metal ore or slag is mixed with the low vapour-pressure molten salt or ionic liquid to form a mixture. The mixture is aerated, via for example having the crucible not be covered. The crucible is temperature controlled to enable all metal and metal oxides to be extracted from the ore or slag, and to form metal ions which are dissolved in the liquid solution in the mixture.

In step 220, the liquid solution with the metal ions is separated from the metal depleted solid ore or slag by filtration or decanting (pouring off from a level just above the metal depleted solid), or other industrial separation process. The metal depleted solid can be dumped at this point, for example by inverting the vessel, which can then be reused to transfer heat to a new liquid solution of metal rich ore or slag and molten salts or ionic liquid.

In step 230, the metal-rich hot liquid solution is put into an electrochemical reactor for electrodeposition. At this step the very hot liquid (about or above 1000° C.) can be passed in a metal tube from the pot (heat exchanger to a water bath) and the cooled (500° C.) liquid back to a graphite pot which acts as a cathode to make metal. The exchanged heat can be used to make steam from water to drive a turbine generator to make electricity.

In step 240, metal ions from the liquid solution are electrodeposited as pure metal at a carbon cathode while carbon dioxide forms at a carbon anode using an electrical current.

The metal is denser than the salt and can be poured out from the bottom of the reaction vessel (like a graphite crucible) while metal-depleted low vapour-pressure liquid remaining on top in the electrochemical reactor may then be recycled to the initial step for again extracting metal from ore or slag.

In the first step of the flowchart of FIG. 2, the ore or slag is carried to a container where it is mixed with a low vapour-pressure liquid (such as a molten salt or ionic liquid). After the low-vapor-pressure liquid is mixed with the ore or slag, the mixture can be stirred, rocked or otherwise agitated to minimize time for maximal metal extraction by maximizing contact between the molten salt or ionic liquid in liquid phase and the metal-rich solid phase. Metals or metal oxides of the ore or slag are dissolved depending of the working conditions. In this part of the process, using a suitable heat exchanger (see FIG. 3, 315), the heat in the ore or slag can be obtained from low vapour-pressure liquid which is used as heat transfer fluids to extract the thermal energy from the slags. The low vapor-pressure liquid can be kept stored in isolated tanks (FIG. 3, 320). When the metals in the ore or slag, and the ions of metals reach the equilibrium, then this mixture is ready to be separated by filtration or decanting (e.g. FIG. 3, 350). In order to help the filtration process, a pressure difference can used by applying a vacuum in a lab scale or by gravity or by setting the relative vertical position of the vessel to be decanted (higher) to pipe liquid to the vessel to collect the liquid (lower). The latter is a more practical configuration for an industrial process. Heat can be removed as the liquid is piped from the higher to lower vessel by passing the pipe through water to generate steam. All of the low vapor pressure liquid that is obtained from the separation process is stored in a container (e.g. FIG. 3, 360). This last container not only has the low vapour-pressure liquid, it also has all the metal ions that were dissolved in the stirring process, which can be electrodeposited as metal.

The low vapour-pressure liquid is kept at constant temperature by heating using an electrical resistance heater or the liquid itself, acting as a heat transfer fluid and heated by molten slags when the liquid is brought into contact with hot slag.

Electroplating can be carried out using graphite electrodes, or the like. As metal forms on the cathode, the graphite anode will oxidize to carbon dioxide due the electrical current and to the presence of trace water or molecular oxygen in the molten ionic fluid being supplied air. The water and molecular oxygen ultimately come from air. The metal and molten salt have different densities. The metal sinks and the salt floats. When the most of the metal ions in the low vapor pressure solution are electrodeposited, a valve is opened to separate the metal from the molten salt. Separation of metal and salt is done either by: pouring the underlying metal out of the bottom of the container with the metal and ionic fluid, or to release the ionic fluid over the metal layer into an isolated container; this container can be mobile (e.g. FIG. 3, 370) for recycling of the low vapour-pressure liquid to the initial step where it is mixed with fresh ores or slags.

FIG. 3 is a schematic chart of an exemplary embodiment of a method and system for extracting metal ion into molten salt (e.g. leaching metals from slags using molten salts). The heat from the hot melted slag 305 passes through a heat exchanger 315. The heat exchanger 315 provides heat to the molten salt and this last hot salt is stored in an isolated tank 320. The melted slag 305 that passes through the heat exchanger 315 goes to a granulator 330; where in the granulator 330 are produced small particles of slag. The particles of slag are mixed with the molten salt; then slag and molten salt are stirred in a tank 340. Separation of molten salt and the slag residues is carried out by decanting or filtration 350. The aerobic molten salt produced during the stirring process dissolves metal ions and the ions are reduced and electrodeposited as metals layers on graphite electrodes 360, wherein the metals are recovered from the graphite. After electrodeposition of the metals, the molten salt is released of metal ions and it is deposited in a tank 370, and now it is ready to be recycled. The recycled molten salt goes to the initial heat exchanger 315 to be heated again and used as a heat transfer fluid.

Figure 4:
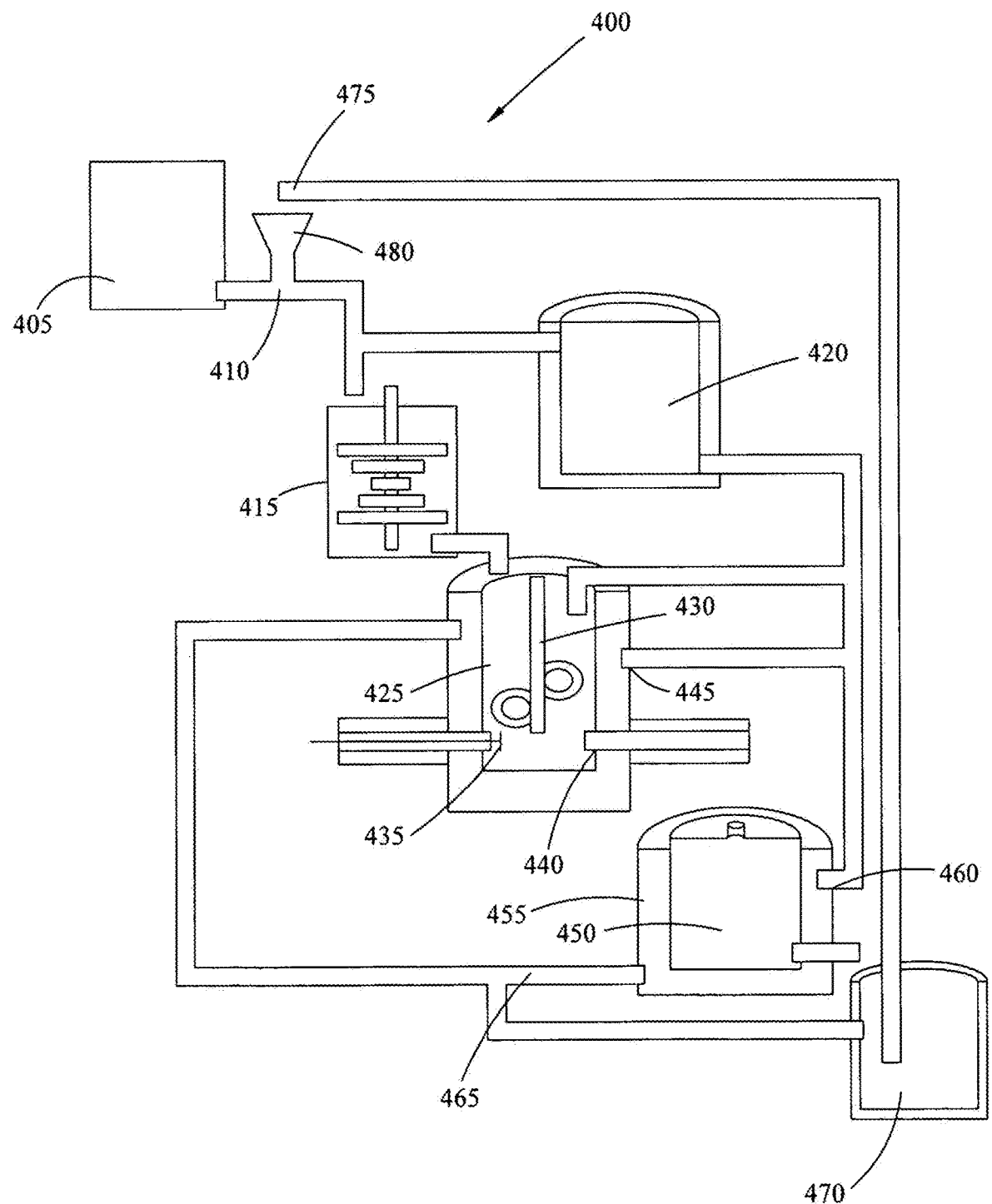
FIG. 4 illustrates a schematic diagram of a pilot plant for extracting metal ion into molten salt and electrodeposition of metal from the metal ions dissolved in molten salt.

FIG. 4 shows a schematic diagram of an exemplary production plant system 400 for extracting metal ions from ore or slag using molten salt based upon the process and system of FIGS. 2 and 3. The plant can be scaled to various sizes by one of skill in the art.

In tank 405 the melted slag is separated from the ore smelter, and it passes through a heat exchanger 410 where the molten slag provides thermal energy to the recycled molten salt dropping from shaft 475 past the heat exchanger 410 to tank 420. The molten slag decreases its temperature due to the heat exchanger and goes to a granulation process where small particles are obtained at tank 415. All of the molten salt that is recycled is deposited in a heat insulation tank 420 where it can be mixed with fresh salts for recovering of the salt wasted in the process. From the heat insulation tank 420 is taken molten salt and it is mixed at tank 425 with the slag that comes from the granulator system 415. The mixture is maintained under stirring via device 430 for some time until it reaches the thermodynamic equilibrium. In this part of the process the metal ions are extracted into the molten salt.

For separation of the molten salt that contains metal ions from the residual slag, the stirring is stopped and after waiting some time the precipitation of the residual slag is carried out; the residual slag goes to the bottom of the tank at 435. In the bottom of the tank at 435 is a gate that is opened for decanting or filtration of the molten salt. In the separation process the residual slag is taken out using a circular arm and the molten salt passes over the slag or through a filter 440. The stirring process keeps a constant temperature by using molten salt that comes from the heat insulation tank.

After separating the molten salt from slag, the molten salt goes to a container 455 with two graphite electrodes at 450 where the metal ions are separated from the molten salt by electrodeposition of metal on a graphite electrode. As metal forms at the graphite cathode, on the anode the graphite will oxidize to carbon dioxide, due to anodic current and the presence of trace water in the molten salt in contact with air. The water ultimately comes from the air. The container where the electrodeposition is carried out is maintained at elevated temperature (greater than 400 degrees Celsius) using heat exchanged from the molten salt that came from the heat insulation tank 420 at pipe opening 460. When almost all of the metal ions are separated from the molten salt by electrodeposition, a gate is open and the metal depleted molten salt is poured into a second heat insulation tank 470 or piped in via pipes 465. From this second insulation tank 470, the molten salt is recycled to the heat exchanger via piping to opening 475 and/or by using a mobile container in order to be heated again at the heat exchanger 410.

It is recognized that the system illustrated in FIG. 4 is one exemplary embodiment, and that one of skill in the art could readily modify the schematic to arrive at an equivalent system of a large scale facility for extracting metal from melted slag.

One-Pot Apparatus and System without Filtration

The following disclosure if for a small scale operation, such as a laboratory as shown in FIGS. 5-7. In this embodiment, a one-pot system (e.g. one-pot apparatus in FIG. 7) is used without filtration or decanting (e.g. FIGS. 6 and 7).

A flow chart showing the essential steps to extract and deposit metal, such as copper, in a one pot system is shown in FIG. 6. In step 610, the molten salt comprising NaCl—KCl—ZnCfr is maintained between 400 to 500 degrees Celsius in a graphite crucible. In step 620, copper concentrate of about 20 to 30 percent copper slag was added to the molten salt to form a liquid solution. In step 630, the liquid solution is mixed while being exposed to the air, for about one hour at 400 to 500 degrees Celsius so as to digest the copper in the slag. In step 640, copper metal is formed by electroplating the ionic copper that was dissolved in the molten salt. And in step 650, the copper metal sinks and deposits at the bottom of the graphite crucible (which functions as the cathode). The copper metal is recovered via scraping off of the graphite crucible.

In the one-pot embodiment shown in FIG. 7, an inner graphite crucible 720 housing the heated molten salt or ionic fluid serves as a cathode electrode, while one or more graphite rods 750 vertically immersed in the salt serve as the anode electrode. This offers a clean, efficient and relatively much safer alternative to conventional metal refining. The one-crucible embodiment further comprises: the inner crucible 720 centered within an outer crucible 710 that is filled with a heat source 730, such as smelted slag, to heat the molten salt or ionic liquid and the ore/slag within the inner crucible 720; a manual or automated means to stir 740 that may be used in both inner and outer crucibles (710, 720); and, a power source (not shown) to apply a current between the wall of the inner crucible 720 and the anode rod 750 (e.g. by applying electrodes to both). Both the inner and outer crucibles (720, 710) are made of high temperature resistant, corrosion resistant material, such as a non-porous glassy carbon material or a non-porous ceramic-filled graphite. The inner crucible may also be made of a porous graphite. The outer crucible may also be made of quartz or a non-porous ceramic material.

This bench top embodiment uses a lower temperature ionic liquid, however a more practical commercial large scale system can also be used in which molten salt containing sodium chloride and potassium chloride and zinc chloride eutectic, mixture in a 0.5 to 0.5 to 1 mole ratio, respectively. This NaCl—KCl—ZnCb molten salt melts at 200° C. and is stable to over 1000° C. in air. Furthermore this molten chloride mixture when aerated will dissolve metal and metal oxides at rapid rates in the presence of air and at temperatures greater than 500° C. After all metal and metal oxides are converted to metal chloride (a few hours), the metallic form of the metal chloride is formed by electrodeposition in the same pot. Essentially oxygen from air is the oxidant driving metal dissolution.

EXEMPLIFICATIONS

The following exemplification is of the one-pot apparatus and process (FIGS. 6 and 7).

Experimental Design

The reagents used were sodium chloride (NaCl), potassium chloride (KCl), zinc chloride (ZnCl2), silver chloride, 99.99% silver wire (Alfa Aesar, Premion grade), and cupric chloride from Sigma Aldrich (reagent grade). Concentrated copper ore and copper slag samples were provided by Mexicana de Cobre. The apparatuses used were a heating mantle (Glas Col), 99.9% graphite crucibles (Wang Xueping, Singapore), glassy carbon crucibles (SPI Supplies/Structure Probe, Inc., West Chester, Pa.), graphite rods (McMaster Carr), power supply (Circuit Specialists, Tempe, Ariz.), BioLogic potentiostat (Oak Ridge, Tenn.). A home made reference electrode was made of silver wire in a solution of silver chloride in potassium chloride in a quartz vessel with a zirconia rod sealed into the quartz on the side of the vessel immersed the molten salt to make a tortuous ion flow path, and this Ag/AgCl electrode (SSE) was found to have a potential of 0.2 V versus NHE, details of the reference electrode are found at (.H. H. Elsentriecy [5]) which is incorporated by reference.

The ternary molten salt mixture is used in "one-pot" as the lixiviant and the plating electrolyte had a composition of 13.4 mole % NaCl—33.7% KCl—52.9% ZnCl2 with a melting point (Tm) of 204° C. (see [6,7]). This extraction and plating cell was a conductive carbon crucible as a cathode filled with molten salt and copper concentrate with a graphite rod inserted as anode. An electrical power supply was used to impose a voltage between the anode rod and cathode crucible with the cathode biased negative. A minimum potential difference of about 2.0 V was applied between the anode (graphite rods) and the cathode (graphite crucible) based on thermodynamic calculations and was adjusted to give desired current levels based on cell geometry (electrode area and separation). Since copper is the densest material in the melt, copper sinks and collects on the bottom of the graphite crucible (cathode). For the purpose of analysis, the copper electrodeposited from the molten salt (above) was collected from the bottom of the graphite crucible and washed several times with deionized water (DI water) to remove all salt and soluble impurities, weighed and then sent for elemental analysis. Elemental analyses were performed by Galbraith laboratories, Knoxville, Tenn., USA.

Results and Discussion

The copper extraction and metal formation is a "one-pot" process using a molten eutectic mixture of NaCl, KCl and ZnCl2 as both the lixiviant (to dissolve copper and copper oxide from copper concentrate ore or slag) and as an ionically conductive electrolyte medium for electrodeposition of copper ions as copper metal. Several eutectic molten halide salt mixtures form when NaCl, KCl and ZnCl2 are in an approximate ratio of 1 mole of NaCl, 1 mole of KCl and 1 mole ZnCl2; mixed and heated to melt at around 200° C. The salt is open to the atmosphere when used because it has a low-vapor pressure (~1 psig at 500° C.) and oxygen and water in air assist the metal extraction. The particular ternary mixture used here had a composition of 13.4 mole % NaCl—33.7% KCl—52.9% ZnCl2 with a melting point (Tm) of 204° C. and was used at temperatures in the range between 400 to 500° C. while extracting and electroplating copper. Copper metal was electroplated from the copper that dissolved in the molten salt from the copper concentrate, slag or authentic sample (like copper chloride).

a) Electrodeposition of Copper Metal from Copper (II)-Chloride in Molten Salt.

Cupric chloride was added to the molten NaCl—KCl—ZnCk eutectic salt and then attempts made to electrodeposit copper metal. This was done as a first step to check if copper ions dissolve in molten NaCl—KCl—ZnCk eutectic salt, and if this molten salt mixture can be used as an electrolyte for reductive electrodeposition of these ions as copper metal. A precisely weighed amount (3 gm) of copper chloride dihydrate (CuCfr·2H20) was added to the molten NaCl—KCl—ZnCk salt in a quartz crucible. The copper chloride dihydrate was seen to readily dissolve in the molten salt. The open circuit voltage (OCV) between a copper metal wire electrode in the NaCl—KCl—ZnCf salt with CuC'f was measured versus a silver/silver chloride reference electrode (SSE) immersed in the same salt mixture at 350° C. The OCV between the copper wire and the SSE reference was initially found to be −0.14V, but slowly drifted to more positive values and was about −0.12V after several minutes. Therefore the potential of the Cu/Cu2+ couple in the molten salt mixture was estimated to be about −0.12 V vs SSE.

Next, two graphite rods, serving as anode and cathode, with a SSE reference electrode were put in the molten NaCl—KCl—ZnCk salt with the 3 gm of CuCk'2FTO in the quartz crucible which was heated using a resistive heating tape. Since the OCV for a copper wire in cupric chloride salt was found to be around −0.12 V versus SSE, a constant potential of −0.5 V vs. SSE was applied to the working graphite rod (cathode), and a cell current of about 60 mA/cm2 developed between the graphite working (cathodic) and counter (anodic) electrodes. The overpotential is approximately 0.38 volts (0.5-0.12 volt). At such high reducing overpotentials, the current is expected to be limited by mass transport of copper ions to the working electrode, which is consistent with the constant current observed in the plot of current density (I) versus time (t) shown in FIG. 5. Since the working graphite electrode was the negative pole, it was the cathode, and—as expected—copper metal was seen to electroplate onto the working graphite electrode as current passed in the cell. The graphite counter electrode was an anode so its potential was more positive than the working graphite electrode serving as a cathode.

Next, an attempt was made to make a practical cell design for the electrodeposition of copper metal with a simple power supply. A graphite rod electrode was immersed into a new mixture of copper salt (3 gm of CuCF 2H2O) and molten NaCl—KCl—ZnCb salt in a graphite crucible. An ordinary power supply was used to apply a constant voltage (2.0 V) between the graphite crucible cathode (negative pole) and the graphite rod anode (positive pole).

When the voltage was applied, a current between 40 and 60 mA/cm2 developed. The voltage was applied for 2 h at temperatures ranging from 250° C. to 300° C., and copper metal electroplated at the bottom of the graphite crucible. The measured amount of electrodeposited copper was 1.09 gm, which indicates that the conversion of copper ions to copper metal was effectively 100%, within experimental error. The main conclusion from this experiment is that copper metal can be quantitatively extracted from ionic copper compounds when using the molten chloride salts as a reaction medium (electrolyte) and the cell design as described.

B) Extraction of Copper from Copper Concentrate Using Molten Metal Halide Salts

After verifying the feasibility of the new approach for depositing copper metal from a molten NaCl—KCl—ZnCl2 salt with dissolved CuCl2 ions, the next step was to see if copper could be extracted from copper rich earths, and if the extracted copper could be plated as metallic copper. The copper rich earths studied here were authentic copper concentrate and copper slag, obtained from Mexicana de Cobre.

Success in this experiment is considered a proof of concept for a new "green" technology in which copper is extracted from copper concentrate (or slag) using molten salt and electrodepositing pure copper metal from this molten salt.

This new process uses chloride salts (NaCl, KCl and ZnCb) which are inexpensive, environmentally-benign chemicals compared to the highly toxic and hazardous chemicals, like cyanides and sulfuric acid, presently used in the conventional process for copper extraction. The extent of conversion in the new molten salt process was found to be virtually 100% (vide infra), as previously confirmed by using the pure chemical $CuCl_2.2H_2O$. Essentially, copper extraction occurs from copper earths, because oxygen (or protons on water) dissolved in the salt oxidizes any metallic compounds in the melt and the chloride in the salts break down any oxides thereby dissolving metallic copper and copper oxide found in ore or slag. Electrodeposition of copper metal occurs, because the molten NaCl—KCl—$ZnCl_2$ salt is highly ionically conductive, allowing reduction of dissolved copper ions to copper metal, when a graphite anode is inserted in the salt and a proper external voltage is applied between this anode and the graphite crucible, which acts as the cathode. The two steps (copper extraction and deposition) are done in the same graphite crucible, which gives a simple "one-pot" reactor for processing copper rich earths to copper metal. Reaching this result required some optimizations.

The same setup and conditions optimized for electrodepositing metallic copper from molten salt loaded with cupric chloride were used in the first attempt to extract copper from a real copper containing mining sample and to electrodeposit the extract copper as copper metal. However, when real copper concentrate sample was used, it was seen that further optimization was required. For example, during the processing of a copper concentrate sample, copper was deposited on the crucible wall and bottom, and even into the wall of porous graphite. Furthermore, the appearance of the electrodeposited copper was dull suggesting the presence of impurities.

Changes in the copper extraction (time, temperature) and electrodeposition conditions (potential, temperature, time) were done to optimize conditions of the processing of the copper concentrate in terms of the experimentally determined percent of copper metal formed versus the copper assayed in the copper rich earth (concentrate or slag). The goal was to change conditions and raising the conversion efficiency (which is the extent copper metal recovered from the copper concentrate ore or slag) which was the criterion used to determine that the change in a condition was an improvement.

After much trial and error, a suitable cell was found for processing copper extraction and deposition of metallic copper with high efficiency. This cell was changed from pure (but porous) graphite to a non-porous glassy conducting carbon crucible to hold the molten NaCl—KCl—$ZnCl_2$ salt with copper rich earth. The temperature of molten salt mixture was at least 400° C. to lower viscosity of the melt. Stirring was found essential. See FIG. 7.

After processing a copper rich earth (Cu concentrate or slag), copper was not in the wall of the crucible but could be seen clearly deposited on both the wall and the bottom of the crucible as can.

Copper was formed using the glassy carbon crucible as a cathode and was collected and transferred to a glass beaker then washed with DI water. The copper was plated at high over-potential and so other elements were co-plated with copper during the extraction and plating process.

In order to determine the extent the copper extracted from the copper rich sample, unprocessed sample materials were sent to a third party (Galbraith Laboratories, Inc., TN, USA) for chemical analysis. The analysis was to provide the percent of copper in the as received unprocessed sample (Cu concentrate) and of the material that was collected after processing (the extracted material). Three replicate samples of copper concentrate and extracted material were analyzed. The extent of copper conversion was estimated. Table 1 shows assay of copper concentrate ore and corresponding electrodeposited copper. As shown in Table 1, the experimentally determined extent of conversion of copper from the copper ore is 98.36%.

TABLE 1

| Sample | Amount used in analysis (mg) | % Cu |
|---|---|---|
| Cu concentrate sample | 153.42 | 19.9 |
|  | 158.39 | 21.7 |
|  | 152.77 | 20.8 |
| Average (sum/3) | 154.86 | 20.8 |
| Normalization to 1 gm (1000 mg) | Then each 1 gm (1000 mg) of Cu concentrate contains 208 mg of Cu | |
| Extracted material (Cu + other co-plated elements) | 156.33 | 19.2 |
|  | 152.13 | 19.5 |
|  | 155.76 | 22.7 |
| Average (sum/3) | 154.74 | 20.46 |
| Normalization to 1 gm (1000 mg) | Then each 1 gm (1000 mg) of extracted material contains 204.6 mg of Cu | |
| Extent of conversion | Extracted Cu weight in 1 gm/Cu weight in 1 gm of Cu concentrate = 204.6/208 × 100 = 98.36% | | c) Extraction of Copper from Copper Slag Using Metal Halide Salts

Copper metal was extracted from a copper containing slag using the same procedure optimized for extracting copper metal from Cu concentrate. The starting amount of slag was 50 gm. The extracted material was 1.3 gm. This amount (1.3 gm) was sent to the same company (Galbraith Laboratories, Inc., TN, USA) for analysis. Table 2 shows the percentage of copper (% Cu) in the 1.3 gm of material extracted from the 50 gm of the slag.

TABLE 2

| Sample | Amount used (mg) | % Cu |
|---|---|---|
| Cu slag | 151.58 | 1.61 |
|  | 152.48 | 2.09 |
|  | 151.21 | 2.14 |
| Average (sum/3) | 151.75 | 1.94 |
| Normalization to 1 gm (1000 mg) | Then each 1 gm of the extracted material contains 19.4 mg Cu. | |

From the result in Table 2 it is clear that from the 1.3 gm (extracted from 50 gm of slag) there are 25.22 mg of Cu. So for each 100 gm of slag, 50.44 mg of Cu can be recovered which is considered a significant amount with considerable economic value and impact, considering million tons of slag per year are generated from conventional copper extraction processes [1], These exemplary embodiments are a positive proof-of-concept that an alternative process to the conventional process can be used for extracting copper from a copper-rich concentrate or slag and depositing the extracted copper as copper metal. This new process is done in one-pot using molten NaCl—KCl—$ZnCl_2$ salt as both the copper extracting fluid (lixiviant) and the electrolyte for electrodeposition of copper metal. The NaCl—KCl—$ZnCl_2$ salt is environmentally benign since it is made of non-toxic elements and emits no toxic vapors.

The copper completely dissolves from the concentrate or slag, when these are added to the aerobic eutectic molten chloride salt contained in a graphite or glassy carbon crucible. After the copper concentrate or slag is digested, a graphite anode is inserted in the molten salt mixture. A power supply is connected to the graphite rod anode and the graphite crucible, which serves as a cathode, and then the copper ions in the molten salt are reduced and deposited as copper metal, which sinks to the bottom of the graphite crucible. On a large scale, opening a valve at the bottom of a production crucible would allow harvesting of the copper metal product by simply draining the copper out of crucible. The total efficiency for extraction and deposition is virtually 100% as determined by elemental and gravimetric analyses.

Electrodepositing the copper from the molten NaCl—KCl—ZnCl2 salt essentially regenerates the molten NaCl—KCl—ZnCl2 salt. Since the NaCl—KCl—ZnCl2 salt can be regenerated, the new processing is not just environmentally benign but also can be both sustainable and economical. This processing is well suited to processing earthen materials rich in silver and gold as well as copper and mixtures of all three metals.

Although the results are quite new, there seems to be no reason that the conventional hydrometallurgical processing cannot be replaced by the new molten salt processing which at this time appears to be a more economic, efficient, sustainable and environmental benign alternative.

CONCLUSION

The terms "plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed at the same point in time.

Although various features of the present disclosure may be described in the context of a single embodiment, the features may also be provided separately or in any suitable combination. Conversely, although the various embodiments may be described herein in the context of separate embodiments for clarity, they may also be implemented in a single embodiment.

It is to be understood that the phraseology and terminology employed herein is not to be construed as limiting and are for descriptive purpose only.

It is to be understood that the details set forth herein do not construe a limitation to an application of the various embodiments.

Furthermore, it is to be understood that the various embodiments of the present disclosure can be carried out or practiced in various ways and that the invention can be implemented in embodiments other than the ones outlined in the description above.

REFERENCES

1. Mark E. Schlesinger, Matthew J. King, Kathryn C. Sole, William G. Davenport, Extractive Metallurgy of Copper, Fifth Edition (2011), Elsevier, printed and bound in Great Britain, ISBN: 978-0-08-096789-9.
2. Jianming Lu and David Dreisinger, "Solvent extraction of copper from chloride solution I: Extraction isotherms", Hydrometallurgy 137 (2013) 13-17.
3. S. Ayata and H. Yildiran, "Copper extraction from gold bearing copper (II) sulphide without thermal process to obtain gold concentrate", Minerals Engineering 18 (2005) 901-904.
4. Ionela Birloaga, Ida De Michelis, Francesco Ferella, Mihai Buzatu and Francesco Veglio, "Study on the influence of various factors in the hydrometallurgical processing of waste printed circuit boards for copper and gold recovery", Waste Management 33 (2013) 935-941.
5. H. H. Elsentriecy and D. F. Gervasio, "Establishing Electrode Potentials in Molten Salts", manuscript in preparation (2015).
6. Dominic Gervasio, Hassan H. Elsentriecy, Luis Phillipi da Silva, A. M. Kannan, Xinhai Xu, "Materials Challenges for Concentrating Solar Power", Chapter 4, in Nanoscale Materials and Devices for Electronics, Photonics and Solar Energy, ISBN 9783319186320, Stephen Goodnick, Anatoli Korkin, and Robert Nemanich, Editors, in the "Nanostructure Science and Technology" series, editor: David Lockwood Springer editor: David Packer, Springer, N.Y., NY (2015).
7. K. Vignarooban, P. Pugazhendhi, C. Tucker, D. Gervasio and A. M. Kannan, "Corrosion resistance of Hastelloys in molten metal-chloride heat-transfer fluids for concentrating solar power applications", Solar Energy, 103, pp. 62-69 (2014).
8. "Materials Challenges for Concentrating Solar Power", H. H. Elsentriecy et al., Nanoscale Materials and Devices for Electronics, Photonics and Solar Energy in "Nanostructure Science and Technology", Springer, N.Y., NY, Stephen Goodnick, Anatoli Korkin, and Robert Nemanich, David Lockwood, David Packer, Editors in press (2015).

The invention claimed is:

1. An environmentally friendly leaching process for extracting and depositing metals from ore and slag, the process comprising:
    (a) passing a molten ore or slag through a heat exchanger to transmit heat from the molten ore or slag to the heat exchanger;
    (b) heating a non-volatile low vapor pressure liquid with the heat exchanger;
    (c) transmitting the heated non-volatile low vapor pressure liquid to an open air crucible;
    (d) dissolving ore or slag into the non-volatile low vapor pressure liquid in the open air crucible until the mixture is a liquid solution with metal ions and undissolved ore or slag;
    (e) separating, using a filtration or decanting mechanism, said liquid solution from said undissolved ore or slag;
    (f) transferring said liquid solution from the open air-crucible into an electrochemical reactor via the filtration or decanting mechanism, said electrochemical reactor comprising:
        i. a high temperature resistant housing;
        ii. a cathode electrode and an anode electrode connected to a direct current power supply on an upper end, and immersed in said liquid solution on a bottom end; and,
        iii. one or more valves to drain said electrochemical reactor;
    (g) applying a current between the cathode and anode electrode to electrify said liquid solution; and
    (h) electro-depositing metal onto the cathode electrode from the metal ions in the electrified liquid solution, wherein the electro-deposited metal is retrievable via the one or more valves of the electrochemical reactor.

2. The environmentally friendly leaching process of claim 1, wherein the low vapor pressure liquid is a molten salt comprising a eutectic NaCl—KCl—$ZnCl_2$ composition.

3. The environmentally friendly leaching process of claim 1, wherein the metal is selected from the group consisting of copper, silver, and gold, and any combination thereof.

4. The environmentally friendly leaching process of claim 1, further comprising recycling the electrified liquid solution by passing the electrified liquid solution through the heat exchanger comprising melted slag that re-heats the electrified liquid solution.

5. The environmentally friendly leaching process of claim 4, further comprising recycling the heated electrified liquid solution by transporting it back to the open air crucible.

6. The environmentally friendly leaching process of claim 1, wherein dissolving the ore or slag into the low vapor pressure liquid in the open air container further comprises digesting and extracting metals from the ore or slag via oxidization of metal and metal sulphide to metal oxide, and converting the metal oxide into metal chloride.

7. The process of claim 1, wherein the ore or slag being heated, mixed and dissolved into the low vapor pressure liquid is granulated ore or granulated slag.

8. The process of claim 1, wherein the heated low vapor pressure liquid is transmitted to the open air crucible by way of a storage tank.

9. The process of claim 1, further comprising,
(i) after passing the molten ore or slag through the heat exchanger, transmitting the molten ore or slag to a granulator;
(j) converting the molten ore or slag to a granulated ore or a granulated slag; and
(k) transmitting the granulated ore or the granulated slag to the open air crucible;
wherein (i)-(k) occur after (c) and prior to (d).

10. The process of claim 1, wherein the electrochemical reactor further comprises a heating unit to heat the liquid solution.

11. The process of claim 1, wherein the electrochemical reactor further comprises a pressure release mechanism.

12. A leaching system for extracting and depositing metals from ore and slag, comprising:
a. a mixing crucible configured to contain a first mixture of slag or ore with an aerobic low vapor pressure liquid;
b. a heat source;
c. a means for stirring;
d. a filtration or decanting mechanism positioned beneath said mixing crucible and able to remove undissolved slag or ore from the mixing crucible;
e. an electrochemical reactor configured to receive a metal ion-containing liquid from the mixing crucible via the filtration or decanting mechanism comprising:
  i. a high temperature resistant, corrosion resistant crucible;
  ii. a cathode electrode and an anode electrode connected to a power supply; and
  iii. one or more valves to drain a metal-ion depleted liquid from the electrochemical reactor;
f. a movable re-cycle tank able to receive the metal-ion depleted liquid from the electrochemical reactor; and,
g. a heat exchanger device configured to receive the metal-ion depleted liquid from the re-cycle tank and able to transfer heat from a melted slag to the metal-ion depleted liquid.

13. The leaching system of claim 12, wherein the aerobic low vapor pressure liquid comprises a molten salt or an ionic liquid.

14. The leaching system of claim 13, wherein the molten salt is a eutectic composition of $NaCl$—$KCl$—$ZnCl_2$.

15. The leaching system of claim 12, wherein the electrochemical reactor is configured to maintain the metal ion-containing liquid at about four hundred to five hundred degrees Celsius.

16. The leaching system of claim 12, further comprising a granulation tank for storing melted slag from the heat exchanger device, wherein the granulation tank is connected to the mixing crucible to mix the melted slag with the re-cycled molten salt or ionic liquid.

17. The leaching system of claim 12, wherein the metal is selected from the group consisting of copper, silver, and gold, and any combinations thereof.

18. The leaching system of claim 12, wherein the mixing crucible is able to mix the aerated molten salt until the metal within the slag or ore is extracted via oxidization of metal and low-valency metal cations and metal sulphide to metal oxide and the exchange of the sulfide and oxide in metal sulphide to metal oxide by chloride, thereby converting into metal chloride.

19. The leaching system of claim 12, wherein the heat source is a melted slag or a heat-generating electromechanical device.

20. The leaching system of claim 12, wherein the filtration or decanting mechanism further comprises a vacuum pump.

\* \* \* \* \*